(12) United States Patent
Dorfner et al.

(10) Patent No.: US 10,749,389 B2
(45) Date of Patent: Aug. 18, 2020

(54) METHOD AND ELECTRICAL MACHINE WITH COUPLINGS IN THE COOLING SYSTEM

(71) Applicant: Siemens Aktiengesellschaft, Munich (DE)

(72) Inventors: Matthias Dorfner, Kirchdorf am Inn (DE); Tarik Hodzic, Munich (DE); Matthias Ruetzel, Wuelfershausen (DE)

(73) Assignee: Siemens Aktiengesellschaft, Munich (DE)

( * ) Notice: Subject to any disclaimer, the term of this patent is extended or adjusted under 35 U.S.C. 154(b) by 37 days.

(21) Appl. No.: 15/757,881

(22) PCT Filed: Aug. 16, 2016

(86) PCT No.: PCT/EP2016/069364
§ 371 (c)(1),
(2) Date: Mar. 6, 2018

(87) PCT Pub. No.: WO2017/041995
PCT Pub. Date: Mar. 16, 2017

(65) Prior Publication Data
US 2018/0337568 A1 Nov. 22, 2018

(30) Foreign Application Priority Data

Sep. 8, 2015 (EP) .................................... 15184226

(51) Int. Cl.
*H02K 1/20* (2006.01)
*H02K 9/19* (2006.01)
(Continued)

(52) U.S. Cl.
CPC ................. *H02K 1/20* (2013.01); *H02K 5/10* (2013.01); *H02K 9/005* (2013.01); *H02K 9/19* (2013.01);
(Continued)

(58) Field of Classification Search
CPC ............ H02K 1/20; H02K 9/005; H02K 9/19; H02K 9/193; H02K 5/10; H02K 15/02; H02K 15/06; H02K 2213/12
See application file for complete search history.

(56) References Cited

U.S. PATENT DOCUMENTS 4,080,703 A * 3/1978 Beck, Jr. ................. B21D 53/08
29/890.038
5,973,427 A * 10/1999 Suzuki ..................... H02K 9/19
310/52

(Continued)

FOREIGN PATENT DOCUMENTS

CN 201742181 U 2/2011
CN 102215939 10/2011
(Continued)

OTHER PUBLICATIONS

Scnurr, Machine Translation of WO03005535, Jan. 2003 (Year: 2003).*

(Continued)

*Primary Examiner* — Quyen P Leung
*Assistant Examiner* — Eric Johnson
(74) *Attorney, Agent, or Firm* — Cozen O'Connor

(57) ABSTRACT

An electrical machine includes a laminated core, cooling tubes arranged within the laminated core, and couplings that interconnect the cooling tubes, where a first coupling type has a T-shaped branch and where, in particular, two couplings interconnect two adjacent cooling tubes to one another.

17 Claims, 7 Drawing Sheets

(51) Int. Cl.
*H02K 5/10* (2006.01)
*H02K 15/02* (2006.01)
*H02K 15/06* (2006.01)
*H02K 9/00* (2006.01)

(52) U.S. Cl.
CPC ............ *H02K 15/02* (2013.01); *H02K 15/06* (2013.01); *H02K 2213/12* (2013.01)

(56) References Cited

U.S. PATENT DOCUMENTS

| | | | |
|---|---|---|---|
| 2004/0169427 A1* | 9/2004 | Hoppe | H02K 1/20 310/54 |
| 2008/0252157 A1 | 10/2008 | Muller et al. | |
| 2011/0162273 A1 | 7/2011 | Mittelmark et al. | |
| 2013/0285487 A1 | 10/2013 | Pyrhonen et al. | |
| 2014/0015351 A1 | 1/2014 | Marvin et al. | |

FOREIGN PATENT DOCUMENTS

| | | | |
|---|---|---|---|
| CN | 102931739 | 2/2013 | |
| CN | 102971948 | 3/2013 | |
| CN | 103444055 | 12/2013 | |
| DE | 19813160 | 11/1998 | |
| DE | 19757605 | 6/1999 | |
| DE | 10131119 | 1/2003 | |
| DE | 102005044832 | 3/2007 | |
| JP | S4718006 | 10/1972 | |
| JP | 2009-261181 | 11/2009 | |
| WO | WO-03005535 A2 * | 1/2003 | ............... H02K 1/20 |
| WO | WO 2012/004858 | 1/2012 | |

OTHER PUBLICATIONS

Office Action dated Jul. 2, 2019 issued in Chinese Patent Application No. 201680051801.8.

* cited by examiner

METHOD AND ELECTRICAL MACHINE WITH COUPLINGS IN THE COOLING SYSTEM

CROSS-REFERENCE TO RELATED APPLICATIONS

This is a U.S. national stage of application No. PCT/EP2016/069364 filed 16 Aug. 2016. Priority is claimed on European Application No. 15184226 filed Sep. 8, 2015, the content of which is incorporated herein by reference in its entirety.

BACKGROUND OF THE INVENTION

1. Field of the Invention

The invention relates to an electrical machine with a laminated core, where the electrical machine is cooled to improve its efficiency.

2. Description of the Related Art

DE 198 13 160 A1 discloses a cooling device for an electric motor which comprises a plurality of inwardly projecting stator poles that are arranged in the circumferential direction such that an axially extending space is formed between two adjacent stator poles. Coils are wound onto the respective stator poles. Here, cooling devices are arranged such that they are in thermal contact with the coils adjacent thereto.

DE 10 2005 044 832 A1 discloses an electrical machine with a rotor and a stator, where the rotor comprises a shaft and the longitudinal extent of the electrical machine is defined by the shaft axis and where the electrical machine is coolable by a cooling circuit. The cooling circuit comprises at least one cooling tube that extends substantially in the longitudinal extent of the electrical machine. The cooling circuit furthermore comprises a first circular, not completely circumferential distribution tube which defines a plane, where the axis of the longitudinal extent of the electrical machine is substantially perpendicular to the plane. Here, at least one cooling tube is connectable in a leak-tight manner to the first distribution tube, where a coolant can flow through the cooling circuit.

SUMMARY OF THE INVENTION

It is an object of the invention to facilitate the use of cooling tubes for cooling an electrical machine.

This and other objects and other advantages are achieved in accordance with the invention by an electrical machine and a production method for the electrical machine, where cooling tubes of an electrical machine are connectable with couplings. The cooling tubes are located, for example entirely, partially or predominantly, in a laminated core of the electrical machine. Copper tubes are, for example, bent and arranged in suitable grooves or passages provided for this purpose in the laminated core, or suitable standard parts of copper or another metallic material are brazed to the tubes. The laminated core of the electrical machine is, for example, the laminated core of a stator of the electrical machine or the laminated core of a rotor of the electrical machine. The couplings are part of the cooling system for the electrical machine. As a result, the couplings are cooling elements for the electrical machine. The electrical machine is, for example, an electric motor or a generator. Electrical machines are, for example, synchronous machines or asynchronous machines. The electrical machine may also be segmented. The stator of a segmented electrical machine comprises segments, each of which comprises a laminated core with cooling tubes.

In one embodiment of the electrical machine with a laminated core, cooling tubes are located in the laminated core. The laminated core is, for example, the laminated core of a primary part or of a secondary part. The primary part is, for example, a stator and the secondary part, for example, a rotor or armature. The electrical machine may be a rotational machine or a linear machine and may be operated as a motor or as a generator. The cooling tubes are, for example, made from a metal such as copper, iron, aluminum, an alloy, or a temperature-resistant plastics material. During operation of the electrical machine, cooling fluid can be caused to flow through the cooling tubes. The cooling tubes can be connected together via the couplings. In this manner, it is possible to construct a cooling system or cooling circuit. The couplings may be manufactured from or comprise different materials. Couplings may in particular comprise the same materials as the cooling tubes, or also materials that differ therefrom. A coupling of plastics material can, for example, be produced inexpensively and shaping is also simple to achieve.

There is at least one first coupling of a first coupling type that comprises a T-shaped branch or a T-shaped shape. The first coupling type is made T-shaped. The first coupling type thus comprises three orifices. At least two couplings are necessary for connecting two cooling tubes. These two couplings are in particular directly connected together and each directly connected to one of the two cooling tubes. Two adjacent cooling tubes are thus connected or connectable together via two couplings.

The couplings are part of the cooling system of the electrical machine and are thus cooling elements. Cooling elements for connecting cooling tubes of an electrical machine can be used in a standardized manner for different sizes, in particular different diameters and thus different curvatures, of the electrical machine. Cooling tubes for different machine sizes may accordingly be connected together with a few types of couplings.

In one embodiment of the electrical machine, the couplings are pluggable or plugged onto the cooling tubes. Here, the cooling tube or the coupling, for example, comprises a seal so that no cooling fluid can escape.

In another embodiment of the electrical machine, the couplings are pluggable or plugged onto each other. Here, at least one of the couplings, for example, comprises a seal so that no cooling fluid can escape.

In a further embodiment of the electrical machine, the first coupling type comprises a first connector, a second connector and a third connector. The connectors may be identical or different with regard to type. One connector type is, for example, a plug-in connection. Another connector type is a screw fastening or a flange.

In another embodiment of the electrical machine, the first coupling type comprises plug-in connections, in particular only plug-in connections, as the connector. Plug-in connections comprise a plug side and a socket side. The first coupling type is thus constructed such that the first connector is a plug-in connector and the second connector a socket connector. The plug-in connector of a coupling may accordingly be or have been plugged into the socket connector of a further coupling.

The first connector of the coupling, which is a cooling element, may also be denoted the first side (A side) and the second connector the second side (B side), which differs from the first side. One or more couplings may furthermore comprise a third side (C side), into which a cooling tube engages. A sealing element is, for example, located between the cooling tube and C side. The third side relates to a third connector. Connectors one, two and three form a kind of T shape.

In yet a further embodiment of the electrical machine, in addition to a first connector, the coupling also comprises a second connector and a third connector. The third connector is, for example, a socket connector. The third connector may, for example, be plugged onto a cooling tube. The part of the coupling to be plugged on comprises the socket connector (this is, for example, the third connector). The cooling tube corresponds to the plug-in connector. The socket connector at least partially encloses the plug-in connector.

In another embodiment of the electrical machine, a second coupling comprises a second coupling type. The second coupling type is L-shaped or has an L shape. An angle piece can thus be obtained with the L shape. The angle piece or the coupling of type two has two connectors. The first connector of the second coupling, for example, adjoins the cooling tube and the second connector of the second coupling adjoins a coupling of the first type. The first connector, for example, takes the form of a socket connector and the second connector that of a plug-in connector. Depending on the configuration of the cooling system, the cooling tubes and the different types of couplings, the connector types (plug-in connector/socket connector) for the respective first, second, third and further connectors of a coupling may also be differently selected.

In an embodiment of the electrical machine, the second or a further coupling type comprises a first connector, a second connector and a third connector. The connectors may be identical or different with regard to type. One connector type is, for example, a plug-in connection. A further connector type is a screw fastening.

In another embodiment of the electrical machine, the second or further coupling type comprises only plug-in connections as the connector. Plug-in connections comprise a plug side and a socket side. The second or further coupling type may thus be constructed such that the first connector is a plug-in connector and the second connector a socket connector. The plug-in connector of a coupling may accordingly be or have been plugged into the socket connector of a further coupling.

The various couplings of different types may be at specific positions in the cooling system. The position is in particular at least one of the end faces of the laminated core of the electrical machine, where the electrical machine is in particular a rotating electrical machine.

In another embodiment of the electrical machine, each coupling comprises a direct connection, thus a direct connector, to at least one cooling tube. Accordingly, each coupling of the electrical machine then, for example, comprises either only one A side or only one B side but always a C side as a cooling element. The C side serves to connect the coupling directly to the cooling tube.

In a further embodiment, the electrical machine comprises a third coupling of a third coupling type. The third coupling type has an L shape. An angle piece can here too be obtained with the L shape. The angle piece has two connectors and may cover angles from 0 degrees to 360 degrees, where the L shape is then not always recognizable. The first connector of the third coupling of the third coupling type, for example, adjoins the cooling tube and the second connector of the third coupling of the third type adjoins a coupling of the first type. In contrast with the coupling of the second type, in the case of a plug-in connection the second connector of the third type comprises another plug-in connection type, as in the case of the coupling of type two. If the coupling of type two comprises a plug-in connector and a socket connector, the coupling of type three, for example, comprises only socket connectors and vice versa. In the case of the connectors of the couplings of a different type, the plug-in connector and socket connector should be selected based on the respective prevailing requirements.

In another embodiment of the electrical machine, the number of couplings is greater than or equal to the number of cooling tubes. Due to the large number of couplings, it is simple to connect all the cooling tubes together with a few types of coupling.

In a still further embodiment, the electrical machine comprises teeth in or on the laminated core. The laminated core thus consequently comprises teeth. The number of couplings is greater than or equal to the number of teeth of the laminated core. A cooling tube may also be assigned to each tooth. A large number of cooling tubes enables good and uniform cooling of the laminated core.

In an embodiment of the electrical machine, the couplings are plugged together. In a rotational electrical machine, the couplings, for example, form a ring structure or also only a segment of a circle. Plug-in connections are easy to use during manufacture and are less labor-intensive than welded joints. The plug-in connections may also be potted. The potting compound also contributes to the leak-tightness of the plug-in connections.

In another embodiment of the electrical machine, an O-ring seals the connection of two couplings or the connection of a coupling and a cooling tube.

In a further embodiment of the electrical machine, different couplings, whether couplings of the same type or different type, have different diameters. The flow rate can be adjusted in this manner. The flow rate influences the cooling performance of the various cooling tubes of the electrical machine.

In yet another embodiment of the electrical machine, the connection between the cooling tube and coupling comprises a sealing ring and/or a stop washer. The sealing ring is in particular integrated in the coupling, which facilitates simple assembly.

In an embodiment of the electrical machine, couplings are potted. An end winding may, for example, also be potted with the potting compound of the couplings. Not only is it possible with the potting compound to achieve additional sealing of the couplings to one another or of the couplings to the cooling tubes, but the potting compound may also contribute to cooling the end winding.

In a method for producing an electrical machine, couplings are plugged onto cooling tubes of a laminated core to connect the cooling tubes. By using plug-in connections, the cooling tubes can be connected in a simple manner.

With the method, it is possible to produce an electrical machine of the kind described above or of the kind described below.

In one embodiment of the method, couplings for different flow rates are connected together. The cooling performance can be adapted in this manner. For instance, the cooling performance is dependent on the temperature of the cooling fluid. However, the longer the cooling fluid flows through the cooling tubes in the laminated core, the hotter it becomes.

In another embodiment of the method, the couplings are potted. In accordance with a further embodiment of the method, the couplings here fuse in the region of their plug-in connections. Increased reliability with regard to tightness can therefore be achieved by this fusion.

In a further embodiment of the method, the end winding of the stator of the electrical machine is potted together with the couplings in a potting compound. The potting compound may adjoin the laminated core, so increasing stability.

The invention and further advantageous embodiments of the invention according to the features of the subclaims are hereinafter explained in greater detail by way of example with reference to exemplary embodiments are which are illustrated diagrammatically in the drawings without the invention consequently being limited to said exemplary embodiments, in which:

DETAILED DESCRIPTION OF THE EXEMPLARY EMBODIMENTS

Figure 1:
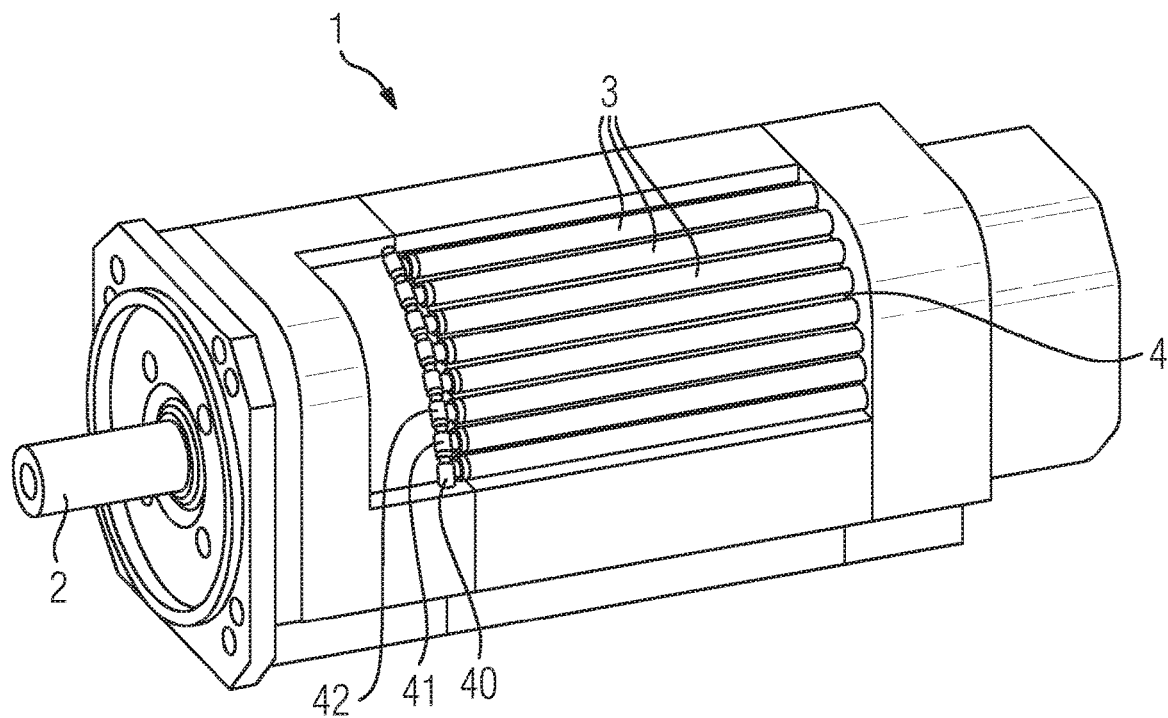
FIG. 1 shows an electrical machine in accordance with the invention.

FIG. 1 shows an electrical machine 1 with a shaft 2 and a plurality of cooling tubes 3 in a laminated core 4. The cooling tubes 3 are connected together via couplings 40, 41, 42, etc. and form part of a cooling system of the electrical machine 1.

Figure 2:
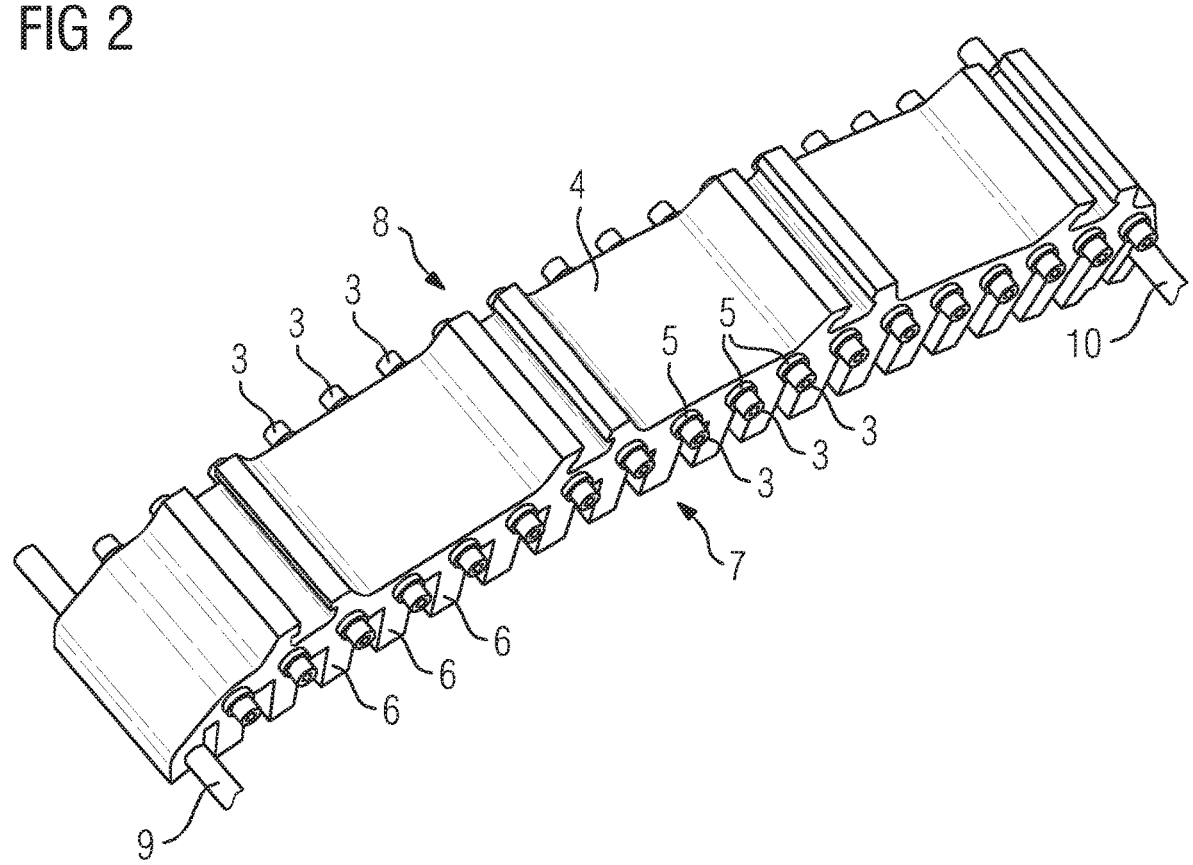
FIG. 2 shows a laminated core with cooling tubes in accordance with the invention.

FIG. 2 shows a laminated core 4 of an electrical machine with teeth 6 and a plurality of cooling tubes 3. The laminated core 4 of FIG. 2 forms part of a segment motor or generator. The laminated core 4 comprises a first end face 7 and a second end face 8. Stop washers 5 are located on the cooling tubes 3 in the region of the end faces 7 and 8. Couplingsthat are not shown in FIG. 2, however, may be placed on the stop washers 5.

The segment part shown with the laminated core 4 also comprises assembly aids 9 and 10.

Figure 3:
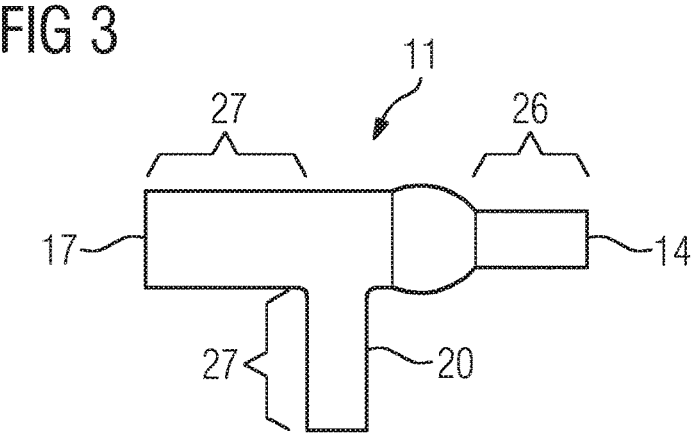
FIG. 3 shows a first coupling of a first coupling type in accordance with the invention.
Figure 4:
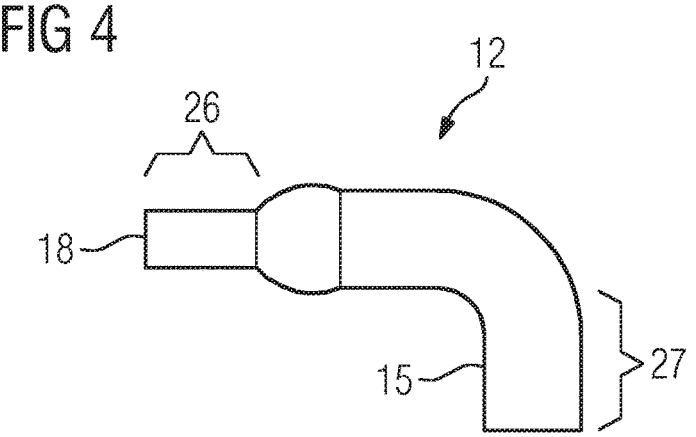
FIG. 4 shows a second coupling of a second coupling type in accordance with the invention.
Figure 5:
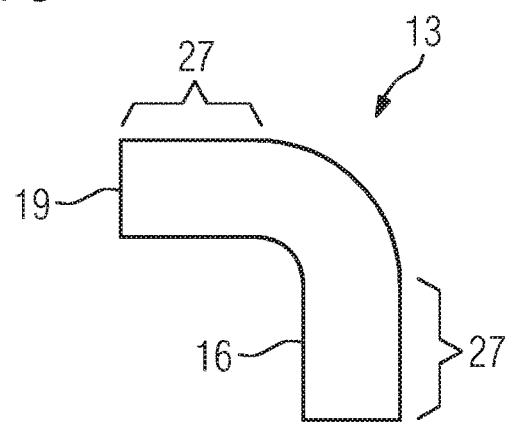
FIG. 5 shows a third coupling of a third coupling type in accordance with the invention.

Couplings 11, 12 and 13 of different types, which are shown individually in FIGS. 3 to 5, are pluggable onto the cooling tubes 3.

FIG. 3 shows a first coupling of a first coupling type 11. This coupling of the first type comprises a first connector 14 that is a plug-in connector 26. The coupling furthermore comprises a second connector 17 which is a socket connector 27. A plug-in connector 26 of a further coupling (not shown) can be plugged into the socket connector 27, because the diameter of the socket connector 27 is greater than the diameter of the plug-in connector 26. The coupling of the first type 11 furthermore comprises a third connector 20. The third connector 20 is a socket connector 27, into which a cooling tube that is not shown in FIG. 3, however, can be plugged. The three connectors 14, 17 and 20 form a T-shaped branch for cooling fluid.

FIG. 4 shows a second coupling of a second coupling type 12. This coupling of the second type 12 comprises a first connector 15 that is a socket connector 27. This coupling furthermore comprises a second connector 18 that is a plug-in connector 26. The socket connector 27 is provided for connection to a cooling tube. If the cooling tube had a smaller diameter than the connector of the coupling, the cooling tube would be the plug-in connector. The second connector 18 of type two is provided for connecting a further coupling, for example, of type 1. The second coupling type 12 has an L shape.

FIG. 5 shows a third coupling of a third coupling type 13. This coupling of the third type comprises, like coupling type 2, two connectors 16 and 19. The first connector 16 of the third coupling type 13 is a socket connector 27. This is also true of the second connector 19 of the third coupling type 13. At least one of the socket connectors is provided for connection to a cooling tube. The third coupling type 13 also has an L shape.

Figure 6:
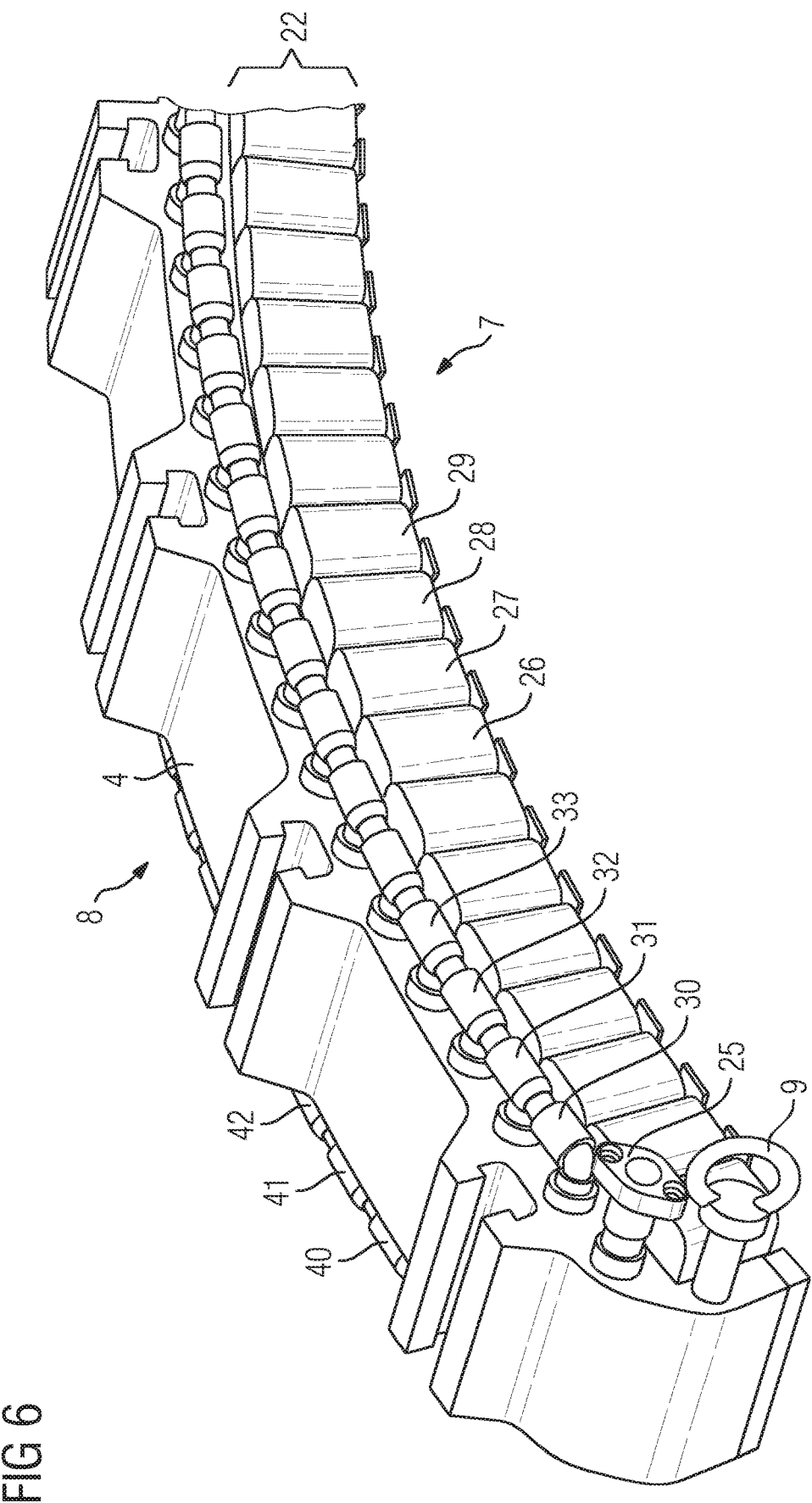
FIG. 6 shows plugged together couplings in accordance with the invention.

FIG. 6 shows a laminated core 4 with a plurality of coils 26, 27, 28, 29. Due to the plurality of coils 26, 27, 28, 29, an end winding 22 is formed on each of the end faces 7 and 8 of the laminated core 4. Cooling tubes, which are not shown in FIG. 6, are guided through the laminated core 4. The cooling tubes are connected together via couplings 30, 31, 32, 40, 41, 42 such that a cooling fluid can be guided through them. As shown in FIG. 6, at least two couplings 30, 31 are mounted on copper tubes arranged adjacent to one another. The cooling tubes are supplied with cooling fluid via a cooling fluid connector 25. Coupling 30 is of coupling type three (see FIG. 5). Coupling 31 is connected to coupling 30. Coupling 31 is of coupling type 1 (see FIG. 3). Coupling 32 is connected to coupling 31. Coupling 32 is also of coupling type 1.

Couplings 30, 31, 32, 33, 40, 41, 42 form part of the cooling system and thus cooling elements. These cooling elements serve to connect cooling tubes of an electrical machine and can be used in a standardized manner for different sizes of electrical machines. This relates in particular to different diameters and thus different curvatures, such that couplings of the same size and same type can be used in electrical machines of a different size and shape.

Figure 7:
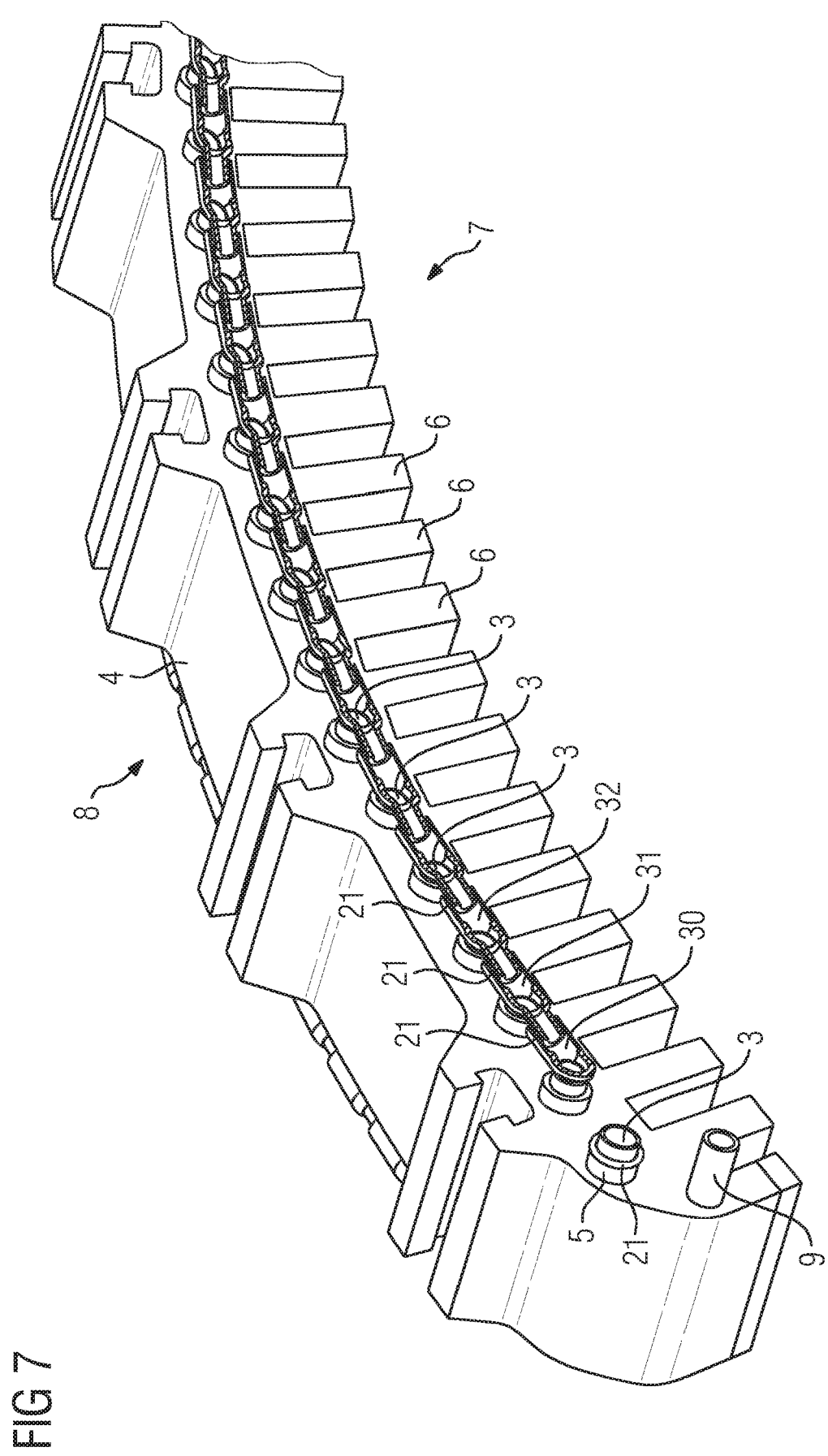
FIG. 7 shows plugged together couplings in section in accordance with the invention.

FIG. 7 shows, similarly to FIG. 6, a laminated core 4 with end faces 7 and 8, where the coils are not shown in FIG. 6. In comparison with FIG. 6, the couplings 30, 31, 32 on the end face 7 are shown in section in FIG. 7. It is thus more readily apparent that some of the couplings are of a different type. The cooling tubes 3 project into the couplings 30, 31 and 32. The coupling 30 is of type 3. The couplings 32 and 32 are of type 1. In the case of the cooling fluid connector, a stop washer 5 and a seal 21 are plugged onto the cooling tube 3. As shown in FIG. 7, at least two couplings are mounted on copper tubes 3 arranged adjacent to one another. Here, the B side of one of the two cooling elements engages in the A side of the other cooling element (coupling). The cavity in the cooling elements, in which the cooling medium flows, is sealed off from the surroundings with at least one cooling element between the A side of the one cooling element and the B side of the other cooling element. The sealing element, i.e., the seal 21 may be an O-ring. The sealing element 21 is in particular arranged centered in a rounded portion at the end of the B side of the cooling element. With this rounded portion, a plurality of cooling elements arranged adjacent to one another can be arranged in alignment on an axis or curved up to a specific curvature without the sealing effect of the at least one cooling element in the rounded portion of the B side of the cooling elements being lost. The cooling tubes 3 can be made from or consist of copper or any other desired suitable materials. The cooling elements may be manufactured from brass, injection molding material or any other desired suitable materials. For reasons of economy, manufacture from injection molding material is possible for mass production. The seals 21 arranged in the rounded portions of the B sides of the cooling elements permit sealing of adjacent cooling elements, i.e., couplings, for different curvatures of the cooling system using the same cooling elements. A cost-saving modular system is thus made possible.

Figure 8:
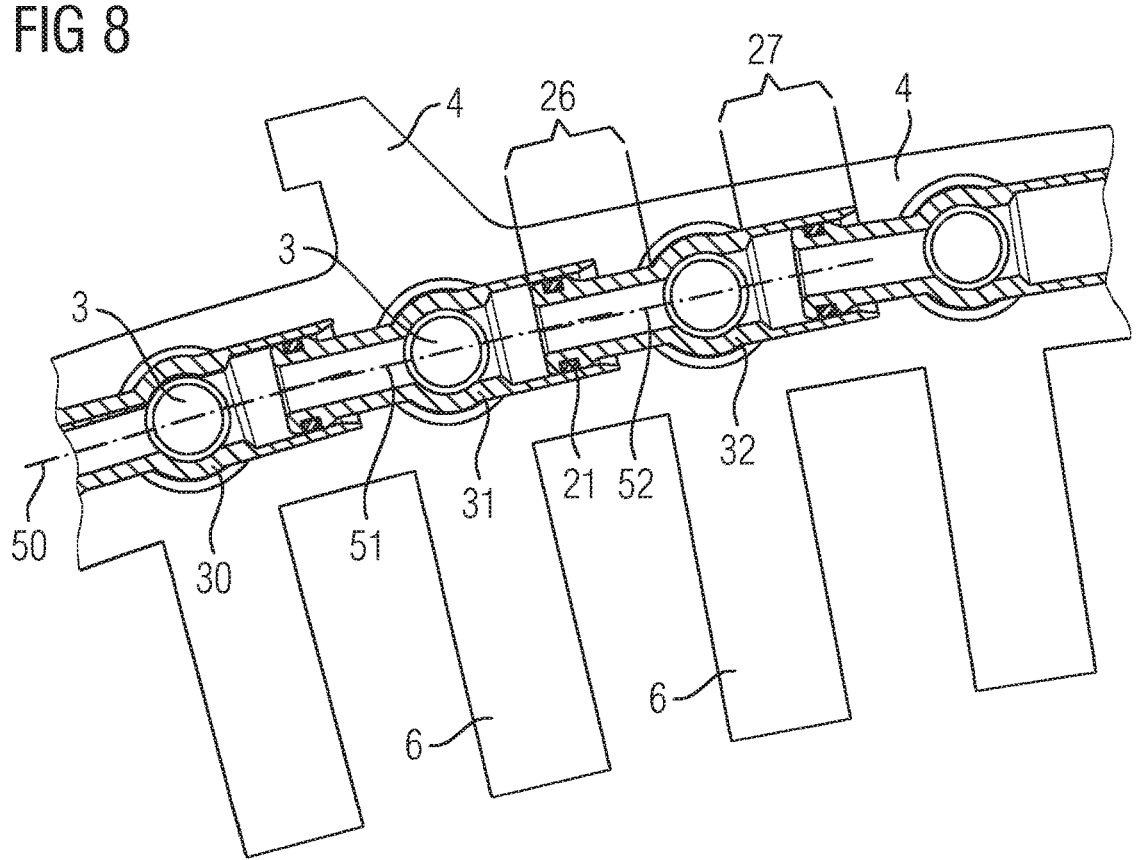
FIG. 8 shows a detail of plugged together couplings in section in accordance with the invention.

FIG. 8 shows a detail from FIG. 7. Each coupling 30, 31 and 32 has an axis of orientation 50, 51 and 52. These axes do not extend in parallel. There is an angular offset that makes it clear that a circular structure can be formed with the couplings. It is also apparent from the magnified representation how the plug-in connectors 26 and socket connectors 27 interlock.

Figure 9:
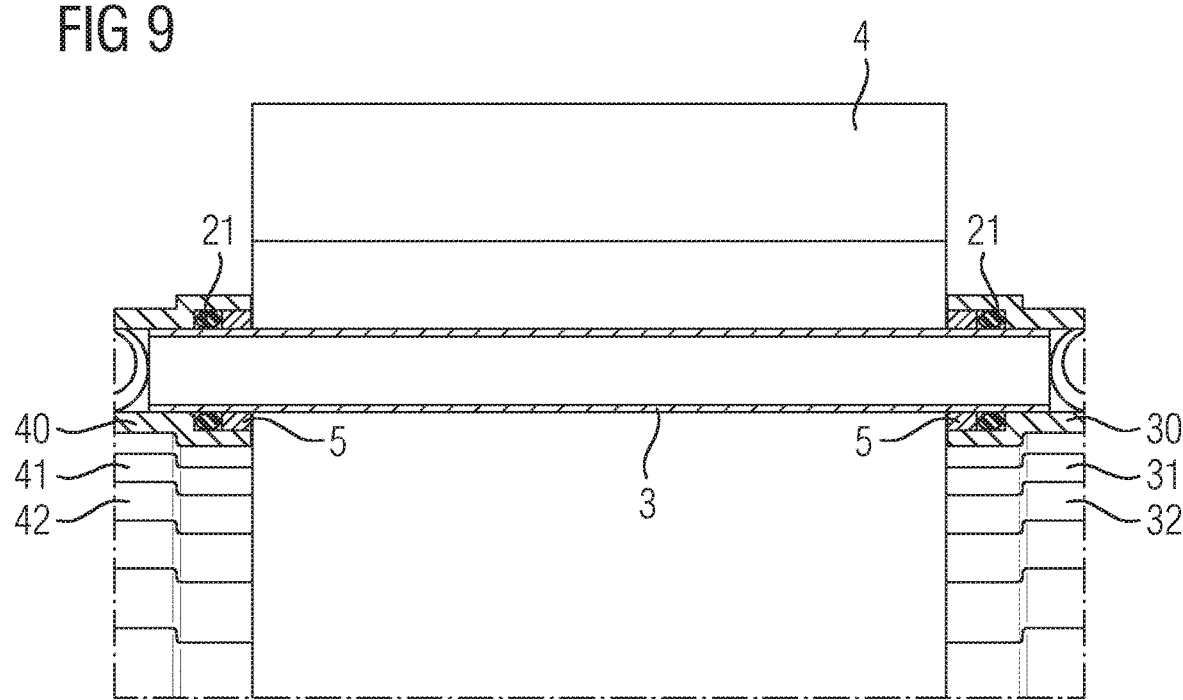
FIG. 9 shows a cooling tube in the laminated core in section.

FIG. 9 shows a cooling tube 3 in the laminated core 4 in section. Couplings 30 and 40 are plugged onto the copper cooling tube 3 at the end faces 7, 8. These are connected to further couplings 31, 32 and 41, 42 respectively. Couplings 30 and 40 are sealed by the seals 21. Stop washers 5 serve to position the seals 21.

Figure 10:
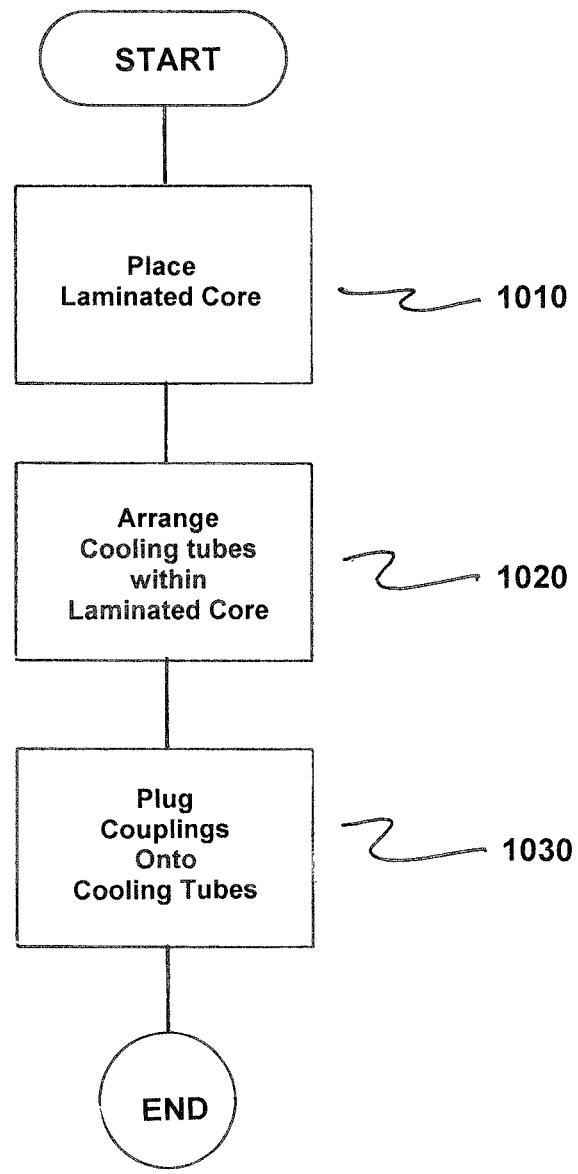
FIG. 10 is a flowchart of the method in accordance with the invention.

FIG. 10 is a flowchart of the method for producing an electrical machine 1. The method comprises placing a laminated core 4 within the electrical machine, as indicated in step 1010.

Next, arranging cooling tubes 3 within the laminated core 4, as indicated in step 1020.

Couplings 30, 31, 32, 40, 41, 42 are now plugged onto the cooling tubes 3 of the laminated core 4 to interconnect the cooling tubes 3, as indicated in step 1030.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electrical machine comprising:
    a laminated core arranged parallel to a rotational axis of the electrical machine;
    cooling tubes arranged within the laminated core; and
    couplings interconnecting the cooling tubes, a first coupling type having a perpendicularly formed T-shaped branch and an axis of orientation to permit formation of a circular structure, and two couplings of the first coupling type interconnecting two adjacent cooling tubes together;
    wherein the first coupling type comprises a first connector, a second connector and a third connector;
    wherein the first connector is a plug-in connector, the second connector is a socket connector, and the third connector is a socket connector;
    wherein two couplings of the first coupling type are directly plugged together with the respective axis of orientation of the two couplings of the first coupling type being angular offset to form the circular structure;
    wherein the two couplings of the first coupling type are directly connected together and are each directly connected to one of two adjacent cooling tubes to connect the two adjacent cooling tubes with the two couplings interconnecting the two adjacent cooling tubes together; wherein a further coupling comprises a second coupling type; and wherein the number of couplings is greater than or equal to the number of cooling tubes.

2. The electrical machine as claimed in claim 1, wherein the second coupling type is L-shaped.

3. The electrical machine as claimed in claim 2, further comprising:
    teeth arranged within the laminated core;
    wherein the number of couplings is greater than or equal to the number of teeth of the laminated core.

4. The electrical machine as claimed in claim 2, further comprising:
    O-rings which seal the couplings.

5. The electrical machine as claimed in claim 1, further comprising:
    teeth arranged within the laminated core;
    wherein the number of couplings is greater than or equal to the number of teeth of the laminated core.

6. The electrical machine as claimed in claim 5, further comprising:
    O-rings which seal the couplings.

7. The electrical machine as claimed in claim 1, further comprising:
    O-rings which seal the couplings.

8. The electrical machine as claimed in claim 1, wherein different couplings have different diameters.

9. The electrical machine as claimed in claim 1, wherein a connection between the cooling tube and the coupling comprises at least one of a sealing ring and a stop washer.

10. The electrical machine as claimed in claim 1, wherein the couplings are potted.

11. A method for producing an electrical machine, comprising:
    placing a laminated core within the electrical machine in parallel to a rotational axis of the electrical machine;
    arranging cooling tubes within the laminated core; and
    plugging couplings onto cooling tubes of the laminated core to interconnect the cooling tubes, a first coupling type having a perpendicularly formed T-shaped branch and an axis of orientation to permit formation of a circular structure, and two couplings of the first coupling type interconnecting two adjacent cooling tubes together; wherein the first coupling type comprises a first connector, a second connector and a third connector;
    wherein the first connector is a plug-in connector, the second connector is a socket connector, and the third connector is a socket connector;
    wherein two couplings of the first coupling type are directly plugged together with the respective axis of orientation of the two couplings of the first coupling type being angular offset to form the circular structure;

wherein the two couplings of the first coupling type are directly connected together and are each directly connected to one of two adjacent cooling tubes to connect the two adjacent cooling tubes with the two couplings interconnecting the two adjacent cooling tubes together;

wherein a further coupling comprises a second coupling type; and wherein the number of couplings is greater than or equal to the number of cooling tubes.

12. The method according to claim 11, wherein couplings for different flow rates are interconnected together.

13. The method according to claim 12, wherein the couplings are potted.

14. The method according to claim 12, wherein the end winding of the stator is potted.

15. The method according to claim 11, wherein the couplings are potted.

16. The method according to claim 15, wherein the end winding of the stator is potted.

17. The method according to claim 11, wherein the end winding of the stator is potted.

* * * * *